United States Patent
Hill et al.

(10) Patent No.: US 10,378,213 B2
(45) Date of Patent: Aug. 13, 2019

(54) PANEL FOR ATTACHMENT TO A MOUNTING SURFACE OF A BUILDING STRUCTURE AND METHOD OF MAKING THE SAME

(71) Applicant: Boral IP Holdings (Australia) PTY Limited, North Sydney (AU)

(72) Inventors: Russell Hill, San Antonio, TX (US); Soufiane Mohand-Kaci, San Antonio, TX (US); Hamed Lakrout, San Antonio, TX (US); Russ Majors, San Marcos, TX (US); Bob Rathbone, San Antonio, TX (US); Nicholas Garcia, San Antonio, TX (US); Kenneth Bruns, Charlotte, NC (US)

(73) Assignee: BORAL IP HOLDINGS (AUSTRALIA) PTY LIMITED, North Sydney (AU)

( * ) Notice: Subject to any disclaimer, the term of this patent is extended or adjusted under 35 U.S.C. 154(b) by 0 days.

(21) Appl. No.: 15/861,378

(22) Filed: Jan. 3, 2018

(65) Prior Publication Data
US 2019/0203477 A1 Jul. 4, 2019

(51) Int. Cl.
*E04F 13/00* (2006.01)
*E04B 2/70* (2006.01)
(Continued)

(52) U.S. Cl.
CPC .......... *E04F 13/007* (2013.01); *E04B 1/40* (2013.01); *E04B 2/707* (2013.01); *E04B 9/225* (2013.01);
(Continued)

(58) Field of Classification Search
CPC ..... E04F 13/007; E04F 13/0869; E04F 13/16; E04F 13/18; E04F 13/0864; E04C 2/32;
(Continued)

(56) References Cited

U.S. PATENT DOCUMENTS 1,426,872 A * 8/1922 Hummert ............... E04F 13/16
52/578
1,931,709 A * 10/1933 Schaffert ............. E04F 13/0864
52/314
(Continued)

FOREIGN PATENT DOCUMENTS

DE 10049172 A1 * 4/2002 .......... E04F 13/0869
EP 1275480 A2 * 1/2003 ............... B27D 1/08
(Continued)

OTHER PUBLICATIONS

John Straube and Graham Finch, Ventilated Wall Claddings: Review, Field Performance, and Hygrothermal Modeling, Research Report—0907, 2009, Building Science Press.
(Continued)

*Primary Examiner* — Ryan D Kwiecinski
*Assistant Examiner* — Matthew J Gitlin
(74) *Attorney, Agent, or Firm* — Bookoff McAndrews, PLLC

(57) ABSTRACT

A panel is configured for attachment to a mounting surface of a building structure. The panel includes a first end surface and a second end surface, spaced from each other along a longitudinal axis; a top edge surface and a bottom edge surface, spaced from each other and offset from the longitudinal axis; and an inner surface and an outer surface, opposed to each other and extending from the first end surface and the second end surface. The inner surface includes a contact portion and a contour portion. The contact portion is disposed on a reference plane. The contour portion is contoured toward the outer surface, away from the reference plane, such that the contour portion defines a channel. The channel extends along at least a portion of a length of the panel, between the first end surface and the second end surface.

18 Claims, 6 Drawing Sheets

FIG. 4

(51) Int. Cl.
  *E04F 13/08* (2006.01)
  *E04B 1/41* (2006.01)
  *E04B 9/22* (2006.01)

(52) U.S. Cl.
  CPC ...... *E04F 13/0864* (2013.01); *B32B 2419/00* (2013.01)

(58) Field of Classification Search
  CPC .......... E04C 2/322; E04C 2/324; E04C 2/326; E04B 2/707; E04B 1/40; E04B 1/7629; E04B 1/4178; E04B 9/225
  See application file for complete search history.

(56) References Cited

U.S. PATENT DOCUMENTS

| | | | |
|---|---|---|---|
| 3,034,261 A * | 5/1962 | Hollmann | E04F 13/007 52/302.1 |
| 3,236,895 A | 2/1966 | Lee et al. | |
| 4,096,679 A * | 6/1978 | Naz | E04F 13/0864 52/523 |
| 4,104,841 A * | 8/1978 | Naz | E04F 13/0864 52/519 |
| 4,883,826 A | 11/1989 | Marugg et al. | |
| 5,060,444 A * | 10/1991 | Paquette | E04D 1/08 52/526 |
| 5,465,547 A * | 11/1995 | Jakel | E04D 1/04 106/608 |
| 5,692,347 A * | 12/1997 | Hulek | E04C 2/322 428/595 |
| 5,809,731 A | 9/1998 | Reiss | |
| 7,790,784 B2 | 9/2010 | Nasr et al. | |
| 8,549,806 B2 | 10/2013 | Snyder | |
| 8,621,799 B2 | 1/2014 | Sade | |
| 8,695,303 B2 * | 4/2014 | Swanson | E04D 3/24 52/478 |
| 8,782,988 B2 | 7/2014 | Wolf et al. | |
| 9,027,302 B2 | 5/2015 | Buoni et al. | |
| 9,267,296 B2 | 2/2016 | Maurer et al. | |
| D755,401 S | 5/2016 | Hill et al. | |
| D755,407 S | 5/2016 | Hill et al. | |
| D755,408 S | 5/2016 | Hill et al. | |
| D755,411 S | 5/2016 | Hill et al. | |
| D755,989 S | 5/2016 | Hill et al. | |
| D755,990 S | 5/2016 | Hill et al. | |
| D755,991 S | 5/2016 | Hill et al. | |
| D755,992 S | 5/2016 | Hill et al. | |
| D755,993 S | 5/2016 | Hill et al. | |
| D757,960 S | 5/2016 | Hill et al. | |
| D783,185 S | 4/2017 | Bruns et al. | |
| D788,949 S | 6/2017 | Hill et al. | |
| 2005/0081468 A1 | 4/2005 | Wilson et al. | |
| 2006/0019568 A1 * | 1/2006 | Toas | E04B 1/80 442/381 |
| 2007/0094958 A1 | 5/2007 | Rogers | |
| 2007/0175154 A1 * | 8/2007 | Wilson | E04F 13/007 52/521 |
| 2007/0186501 A1 * | 8/2007 | Kuelker | E04F 13/007 52/506.06 |
| 2008/0148672 A1 | 6/2008 | Monteer | |
| 2009/0042471 A1 * | 2/2009 | Cashin | B32B 5/18 442/182 |
| 2009/0308001 A1 | 12/2009 | Wu et al. | |
| 2010/0088987 A1 | 4/2010 | Monteer | |
| 2010/0263315 A1 | 10/2010 | Logan et al. | |
| 2010/0281801 A1 | 11/2010 | Shaw et al. | |
| 2011/0154759 A1 | 6/2011 | Wilson et al. | |
| 2012/0247040 A1 | 10/2012 | Buoni et al. | |
| 2012/0285110 A1 | 11/2012 | Mollinger et al. | |
| 2012/0297697 A1 | 11/2012 | Schaefer | |
| 2012/0328823 A1 | 12/2012 | Monteer | |
| 2013/0125487 A1 | 5/2013 | Power et al. | |
| 2016/0280874 A1 | 9/2016 | Crocco et al. | |
| 2019/0017279 A1 | 1/2019 | Norwood et al. | |

FOREIGN PATENT DOCUMENTS

| | | | |
|---|---|---|---|
| EP | 1728936 A2 * | 12/2006 | ............... E04C 2/32 |
| JP | 2000-240085 A | 9/2000 | |
| WO | 8200312 A1 | 2/1982 | |
| WO | 2005099418 A2 | 10/2005 | |
| WO | 2016018226 A1 | 2/2016 | |

OTHER PUBLICATIONS

International Search Report for PCT/US2018/067912 dated Apr. 24, 2019 (3 pages).
U.S. Appl. No. 29/631,899, filed Jan. 3, 2018 (88 pages).

* cited by examiner

PANEL FOR ATTACHMENT TO A MOUNTING SURFACE OF A BUILDING STRUCTURE AND METHOD OF MAKING THE SAME

TECHNICAL FIELD

This disclosure relates to panels for attachment to a mounting surface of a building structure, and the method of forming the panels.

BACKGROUND

Exterior siding systems may include a plurality of panels. The panels are arranged to cover an exterior wall of a building. The panels cover and protect the exterior wall of the building. Additionally, the panels may be configured to present a decorative appearance.

In order to promote airflow and drainage between the panels and the exterior wall, spacers, such as furring strips, are typically placed between the panels and the exterior wall. Therefore, the spacers create a gap or a vertical air channel between the panel and the exterior wall.

SUMMARY

One aspect of the disclosure provides a panel configured for attachment to a mounting surface of a building structure. The panel includes a first end surface and a second end surface, spaced from each other along a longitudinal axis; a top edge surface and a bottom edge surface, spaced from each other and offset from the longitudinal axis; and an inner surface and an outer surface, opposed to each other and extending from the first end surface and the second end surface. The inner surface includes a contact portion and a contour portion. The contact portion is disposed on a reference plane. The contour portion is contoured toward the outer surface, away from the reference plane, such that the contour portion defines a channel. The channel extends along at least a portion of a length of the panel, between the first end surface and the second end surface. The notched portion is contoured toward the outer surface, away from the reference plane, such that the notched portion defines a turbulence-inducing element.

Another aspect of the disclosure provides a panel configured for attachment to a mounting surface of a building structure. The panel includes a first end surface and a second end surface, spaced from each other along a longitudinal axis; a top edge surface and a bottom edge surface, spaced from each other and offset from the longitudinal axis; and an inner surface and an outer surface, opposed to each other and extending from the first end surface and the second end surface. The inner surface includes a contact portion, a first and a second contour portion, first and second notched portions, and an undulating portion.

The contact portion is disposed on a reference plane. The first and second contour portions are each contoured toward the outer surface, away from the reference plane. The first contour portion defines a first channel and the second contour portion defines a second channel. The first and second channels each extend along a length of the panel between the first end surface and the second end surface.

The first and second notched portions are each contoured toward the outer surface, away from the reference plane. The first notched portion defines a first plurality of turbulence-inducing elements and the second notched portion defines a second plurality of turbulence-inducing elements. Each of the first plurality of turbulence-inducing elements extend along the panel between the top edge surface and the first channel and each of the second plurality of turbulence-inducing elements extend along the panel between the bottom edge surface and the third channel.

The undulating portion extends between the first end surface and the second end surface. The undulating portion is disposed between the first contour portion and the second contour portion. The first contour portion is disposed between the first notched portion and the undulating portion. The second contour portion is disposed between the second notched portion and the undulating portion. The undulating portion is contoured toward the outer surface in an undulating fashion, away from the reference plane.

Another aspect of the disclosure provides a method of making a panel configured for attachment to a mounting surface of a building structure. The method may include extruding the mixture into a mold cavity of a continuous mold formed at least in part by opposing surfaces of two opposed belts. The molded panel extends lengthwise, along a longitudinal axis. The panel includes a top edge surface and a bottom edge surface, spaced from each other and offset from the longitudinal axis. The panel also includes an inner surface and an outer surface, opposed to each other. The inner surface includes a contact portion and a contour portion. The contact portion is disposed on a reference plane. The contour portion is contoured toward the outer surface, away from the reference plane, such that the contour portion defines a channel extending lengthwise along at least a portion of the molded panel. At least one of the two opposed belts include a contact portion-forming section, and a contour portion-forming section.

In some embodiments, the mixture may be deposited or transferred into a mold cavity of a continuously running mold, formed at least in part by opposing surfaces of two opposed belts and the interface can be formed between the mixture and an interior surface of one of the two opposed belts. The methods may also include removing the molded panel from the mold.

Voids, e.g., the channel, are formed as part of the molded panel. As such, further machining of the panel to form the voids are not required. Additionally, any skin or other surface layer formed on the molded panel, as result of the molding process, will cover the entire exterior of the molded panel, including within the voids. Also, the voids may be formed through the molding process with complex geometries that may not be achievable or repeatable through other machining processes.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
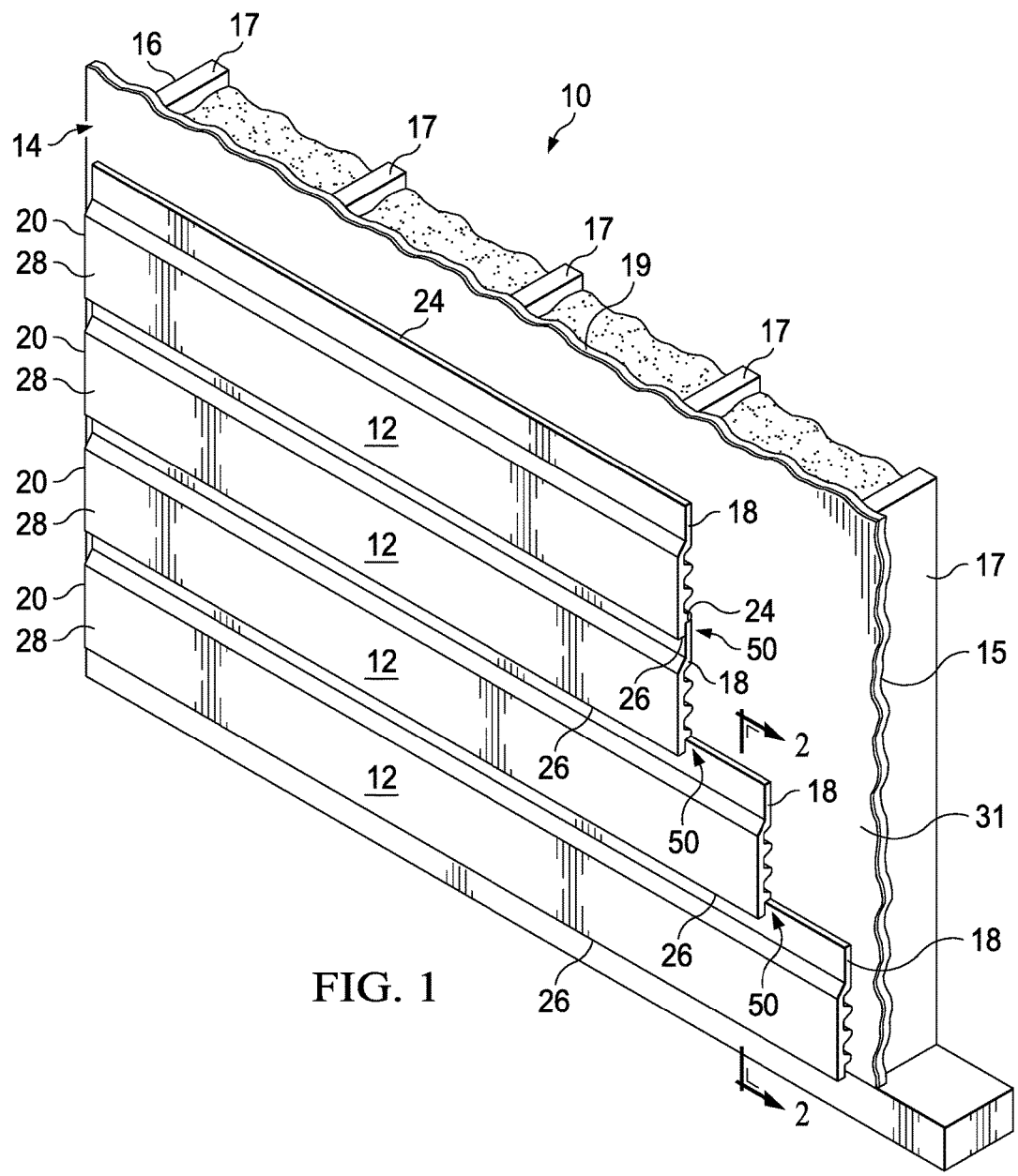
FIG. 1 is a schematic perspective view, partially cut away, of a panel system attached to a building structure.

Referring to the drawings, like reference numbers correspond to like or similar components wherever possible throughout the several figures. There is shown in FIG. 1 a panel system 10 formed from at least one panel 12. In FIG. 1, a plurality of panels 12 (siding) are arranged in cascading relationship to one another on a mounting surface 14 of a building structure 16 to form part of the panel system 10. In most installations, the panels 12 may be arranged along a vertical, or substantially vertical, wall 15 such that the panels 12 extend horizontally and overlap one another to form lap joints 50 therebetween. In other installations, it should be appreciated that the panels 12 may extend vertically.

The panels 12 may define one or more voids 29, e.g., channel 40, turbulence-inducing elements 44, curves 44, and the like, are integrally formed via a molding process, as part of the molded panel, as described in more detail below. The voids 29 may be formed through the molding process with complex geometries that may not be achievable or repeatable through other machining processes. The voids 29 are in fluid communication with one another, which promotes ventilation, such as airflow and drainage of water and/or moisture, out from between the panel and the mounting surface.

The wall 15 may include boards 19 and framing members 17. The boards 19 are attached to the framing members 17. The boards 19, i.e., sheathing, may be any type of suitable board, such as wood, plywood, oriented strand board (OSB), medium-density fiberboard (MDF), and the like.

An optional covering 31, e.g., a house wrap such as spunbond polyethylene, may be attached to an exterior surface of the boards 19. The covering 31 may be required for a variety of reasons, including a requirement of building codes, etc. House wrap may be installed over the boards 19. In one non-limiting example, the house wrap may be integrated with the sheathing. The covering 31 may be attached to the wall 15 with staples, button cap nails, and the like. The covering 31 may also be applied as a liquid. In another non-limiting example, the house wrap may be self-adhering to the boards 19. The covering 31 may be moisture vapor permeable. When present, the covering 31 presents the mounting surface 14.

The panels 12 may be attached to the mounting surface 14 with at least one fastener (not shown in FIG. 1), which may be, for example and without limitation, a nail, a screw, a staple, and the like. Note that the panels 12 shown may also be used as roof tiles, along a sloped mounting surface 14.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The panel 12 may be formed to emulate wood paneling, even though it is formed from polymeric materials. However, the roof tile may emulate other materials, such as stone, clay, and the like, without changing the functional and aesthetic benefits described and shown herein. The method of forming the panel 12 and the associated materials will be described in more detail below.

Figure 3:
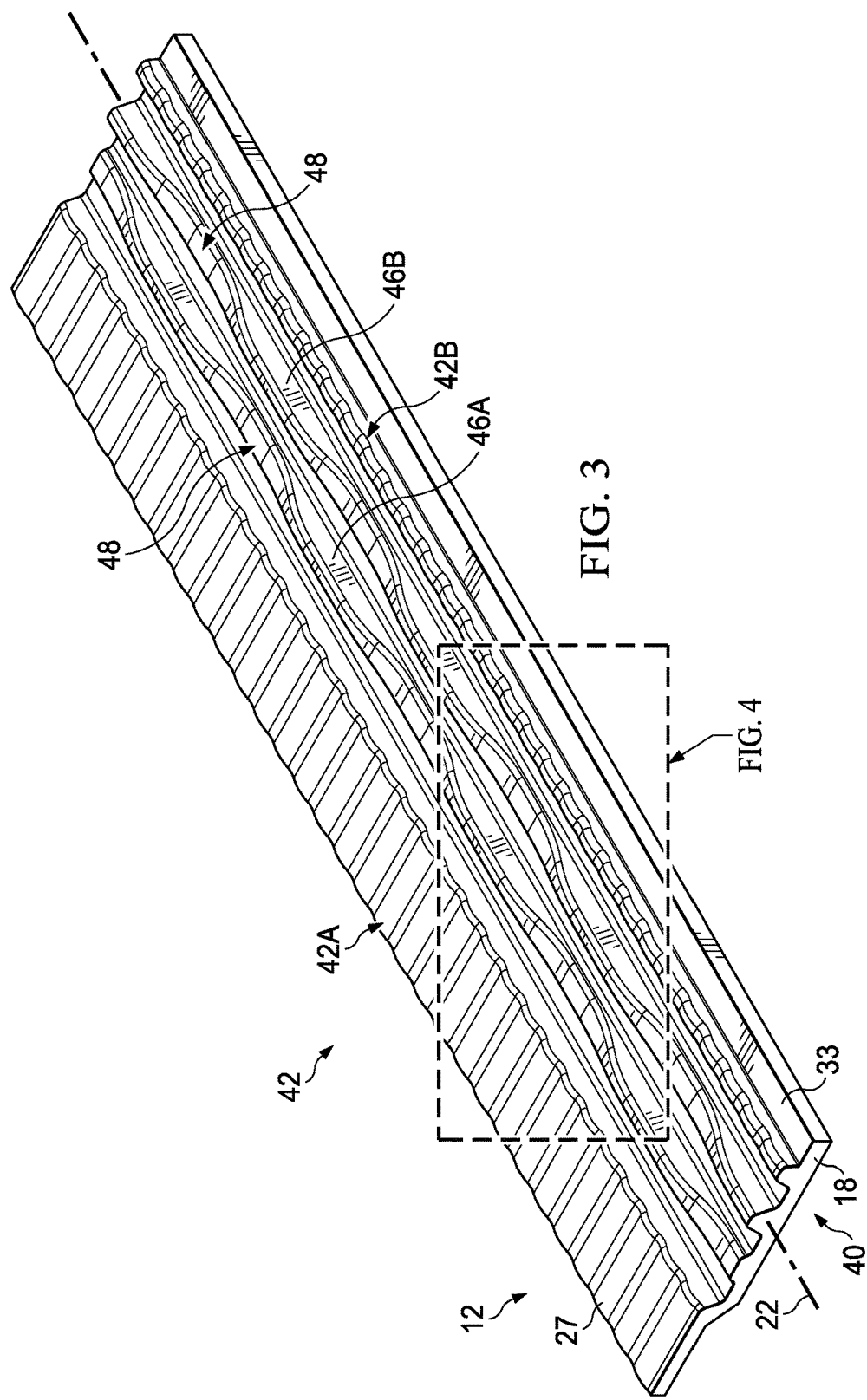
FIG. 3 is a schematic partial perspective view of a first end surface, a bottom end surface, and an inner surface of a panels of the panel system.
Figure 4:
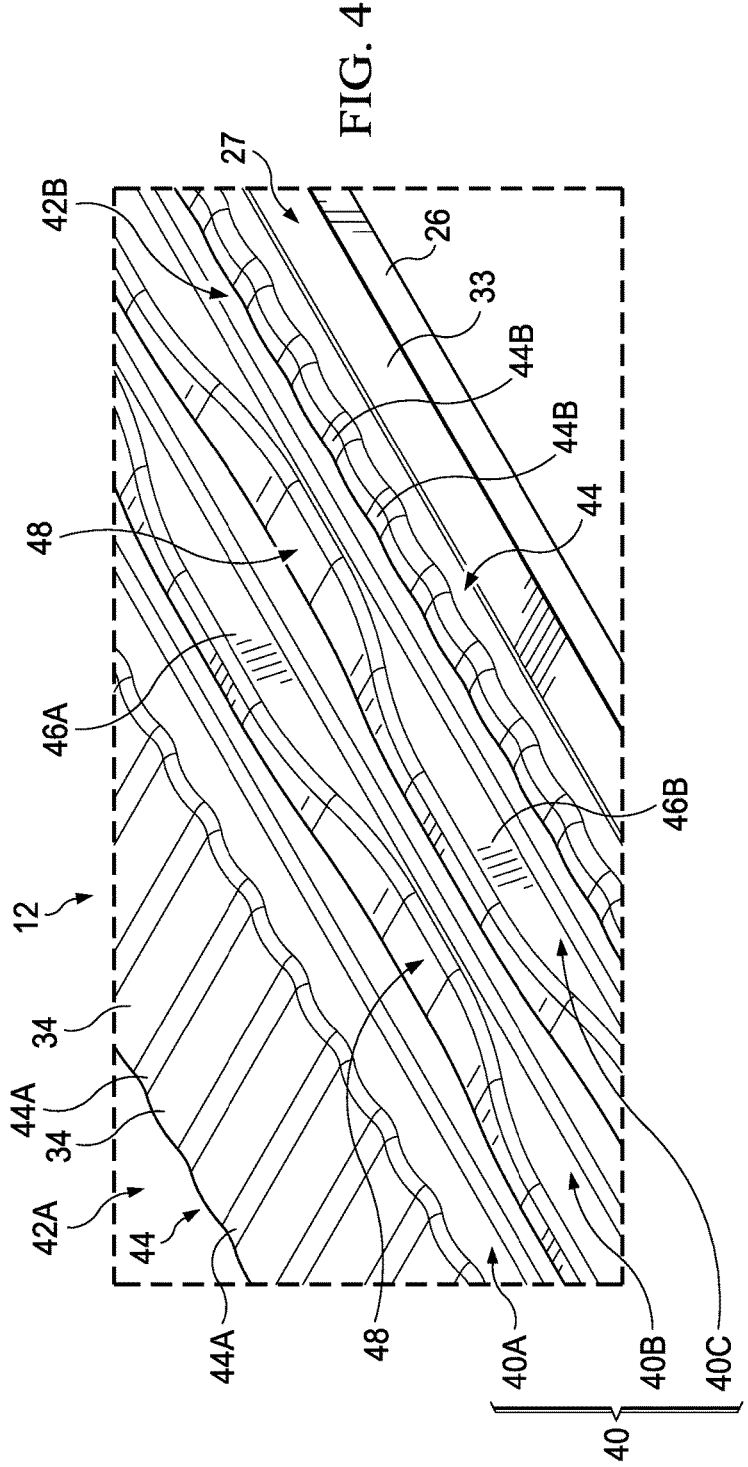
FIG. 4 a schematic fragmentary, enlarged view of one of the panels of FIG. 3, taken around area 4.

With reference to FIG. 3, the panel 12 includes a first end surface 18 and a second end 20 surface spaced from each other along a longitudinal axis 22. The panel 12 extends between a top edge surface 24 and a bottom edge surface 26 that are spaced from each other and offset from the longitudinal axis 22. Additionally, with reference between FIGS. 1 and 3, the panel 12 includes an inner surface 27 and an outer surface 28 opposed to each other and extending from the first end 18 surface and the second end surface 20.

Figure 2:
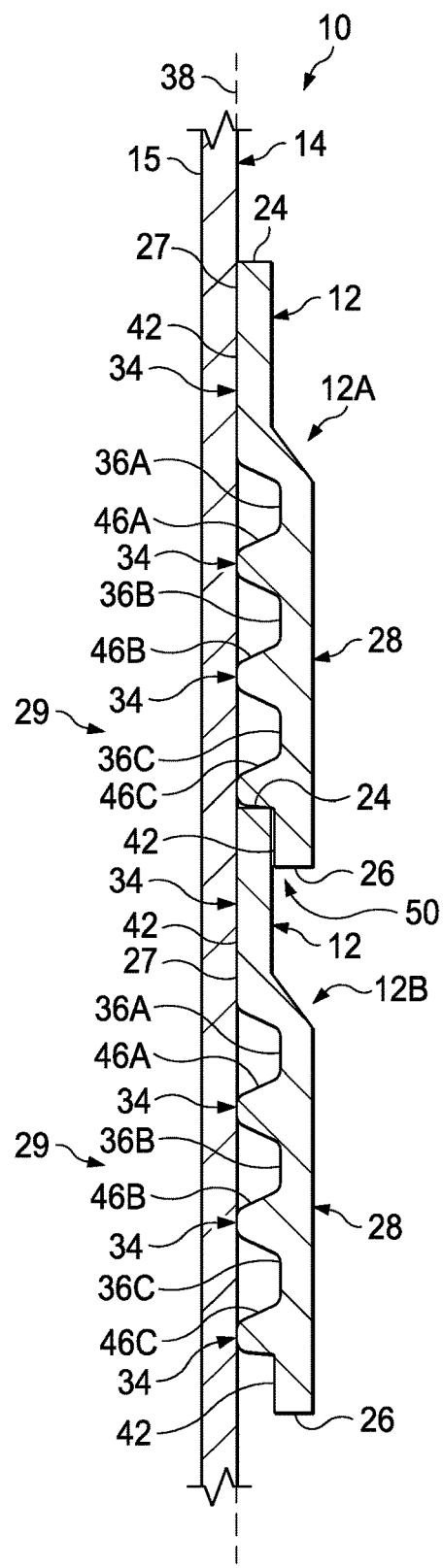
FIG. 2 is a schematic partial cross-sectional side view of a pair of panels of the panel system of FIG. 1, taken along line 2-2.

With reference to FIGS. 1 and 2, the panels 12 are attached to the mounting surface 14 such that the inner surface is in direct contact relationship to the mounting surface 14 and the outer surface 28 is visible when looking at the exterior of the building structure 16.

As will be discussed in more detail below, the inner surface 27 of each panel 12 defines a combination of voids 29 in the material, i.e., channels 40, turbulence-inducing elements 42, and curves 48. The voids 29 are configured to allow ventilation in the form of air flow and fluid flow between the mounting surface 14 and the inner surface of the panel 12 when the panel 12 is disposed in direct contact relationship with the mounting surface 14. For instance, voids 29 can create turbulent flow (i.e., non-laminar flow) of air, water, and/or moisture between the mounting surface 14 and the panel 12 to direct these fluids outward towards the outer surface 28, thereby preventing the water or moisture from being trapped or retained between the mounting surface 14 and the panel 12. As will be discussed in more detail below such turbulent flow results in fluids being expelled from between the mounting surface 14 and the panel 12, preventing or reducing flow of the fluids to the bottom of the mounting surface 14. However, it should be appreciated that water can also drain to the bottom of the mounting surface 14, behind the panels 12, and be directed out from the panels 12 via flashing and the like.

Therefore, since ventilation is provided by the voids 29, spacers, e.g., furring strips, are not required to be disposed therebetween. As such, elimination of the spacers saves the time and cost associated with the added materials and the added labor of installation. Further, elimination of the spacers allows the panels 12 to be placed closer to the mounting surface 14, which can provide better appearance and packaging when attaching the panels 12 around windows, doors, trim, and other features resident on the building structure 16. Also, placement of the panels 12 in direct contact relationship with the mounting surface 14, the voids 29 provide improved ventilation, as compared with the ventilation provided when using a drainable house wrap. More specifically, placement of the panels 12 in direct contact relationship with the mounting surface 14, while still providing ventilation therebetween and direction of water or moisture that may enter into, be present in, or be retained therebetween outward towards the outer surface 28.

The panel 12 extends a length 30 between the first end surface 18 and the second end surface 20. The panel 12 extends a width 32 between the top edge surface 24 and the bottom edge surface 26. In another non-limiting embodiment, a length 30 of the panel 12, extending between the first end surface 18 and the second end surface 20, is at least two times a width 32 of the panel 12 extending between the top edge surface 24 and the bottom edge surface 26. In yet another non-limiting embodiment, the length 30 is at least twelve times the width 32 of the panel 12. In another non-limiting example, the panel 12 may be formed to extend a length 30 of between 1.22 meters (m), i.e., about 4 feet (ft), to 4.88 m (i.e., about 16 ft), and formed to extend a width 32 of between 8.9 centimeters (cm) (i.e., about five inches (in)) to 37.7 cm (i.e., about 15.25 in).

The inner surface 27 includes a contact portion 34 and a contour portion 36. With reference to FIG. 2, the contact portion 34 is disposed on a reference plane 38, and the contact portion 34 is that portion of the inner surface 27 that would be in contact with the mounting surface 14, when the panel 12 is attached the mounting surface 14. The contact portion 34 is disposed adjacent to the top edge surface 24, the bottom edge surface 26, or both. The contour portion 36 is contoured toward the outer surface 28, away from the reference plane 38, such that the contour portion 36 defines at least one channel 40 extending along at least a portion of the length 30 of the panel 12, between the first end surface 18 and the second end surface 20, such that the channel extends continuously between the first end surface 18 and the second end surface 20. The channel 40 may extend along the longitudinal axis 22.

The inner surface 27 also includes a notched portion 42, contoured toward the outer surface 28, away from the reference plane 38. The notched portion 42 defines a turbulence-inducing element 44 extending along at least a portion of a width 32 of the panel 12, in transverse relationship to the longitudinal axis 22. More specifically, the notched portion 42 may define a plurality of turbulence-inducing elements 44, disposed along the longitudinal axis 22 in spaced and parallel relationship to one another, along the longitudinal axis 22. Further, the turbulence-inducing elements 44 may be disposed in evenly spaced relationship to one another along the longitudinal axis 22.

The notched portion 42 may be disposed adjacent to the channel 40. The notched portion 42 may be a first notched portion 42A and/or a second notched portion 42B. The first notched portion 42A defines a first plurality of turbulence-inducing elements 44A and the second notched portion 42B defines a second plurality of turbulence-inducing elements 44B. The first turbulence-inducing elements 44A extend between the channel 40 and the top edge surface 24 and the second turbulence-inducing elements 44B extend between the channel 40 and the bottom edge surface 26. The first turbulence-inducing elements 44A extend a first distance D1 and each one of the second turbulence-inducing elements 44B extends a second distance D2. In one non-limiting example, the first distance D1 may be greater than the second distance D2. More specifically, the first distance D1 may be between four times and six times the second distance D2.

Figure 5:
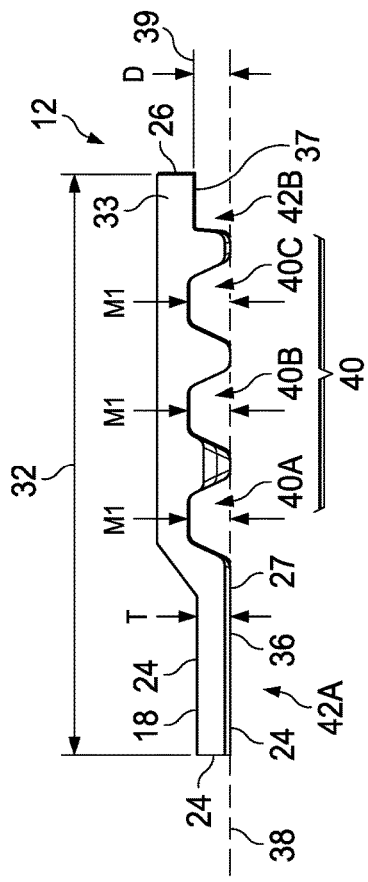
FIG. 5 is a schematic end view of the panel.

With reference to FIG. 5, the first notched portion 42A and the second notched portion 42B each present a plurality of contact portions 36 that are on the reference plane 38. Therefore, when the panel is attached to the mounting surface 14, the contact portions 36 associated with the first notched portion 42A and the second notched portion 42B are in contact with the mounting surface 14.

With reference between FIGS. 2 and 3, a lip 33 extends from the second notched portion 42B, such that the second notched portion 42B is disposed between the lip 33 and the channel 40. The inner surface 27 associated with the lip 33 is disposed on a secondary reference plane 39. The secondary reference plane 39 is offset from the reference plane 38. Therefore, when the panel 12 is attached to the mounting surface 14, the inner surface 27 associated with the lip 33 is spaced from the mounting surface 14. The spacing of the secondary reference plane 39, and thus, the inner surface 27 associated with the lip 33, is sufficient to allow the lip 33 of the panel 12 to overlap a portion of the outer surface 28 of another panel 12B, corresponding the first notched portion 42B. Thus, in order to allow the panels 12 to be attached to the mounting surface 14 in overlapping relationship with one another (as shown in FIGS. 1-2), the portion of the panel 12 associated with the first notched portion has a thickness T that does not exceed the distance D between the reference plane 38 and the secondary reference plane 39.

In the embodiment shown in FIG. 2, the turbulence-inducing elements 44 may be aligned at an angle, relative to the width 32 of the board, of 90 degrees. In another embodiment, the turbulence-inducing elements 44 may be aligned at an angle, relative to the width 32 of the board, of between 40 degrees and 90 degrees.

Figure 9:
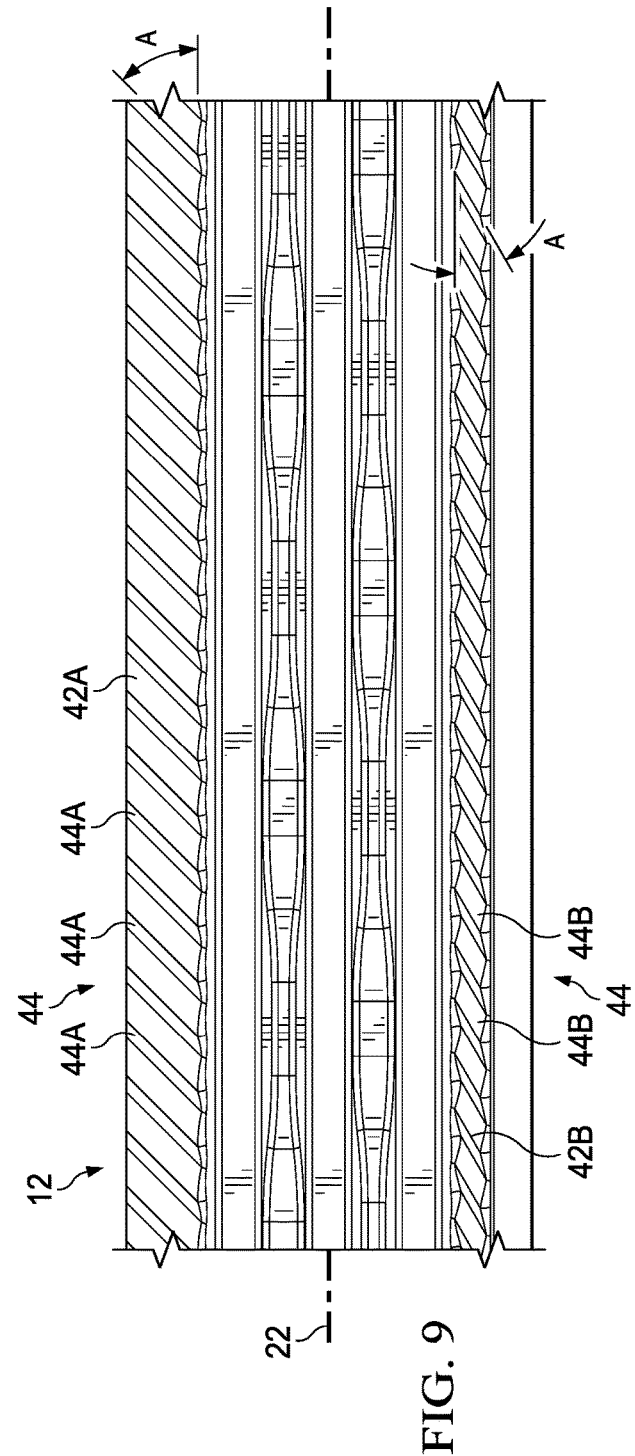
FIG. 9 is a schematic plan view of the inner surface of another embodiment of the panel.

In yet another embodiment, illustrated in FIG. 9, the turbulence-inducing elements 44 may be aligned at an angle A, relative to the width 32 of the board, of 20 degrees to 70 degrees. In another embodiment, the turbulence-inducing elements 44 may be aligned at an angle of 30 degrees to 45 degrees. Placement of the turbulence-inducing elements 44 at an angle of 30 degrees to 45 degrees provides an increased length 30 of the notch, as opposed to when the turbulence-inducing elements 44 are at a 90 degree angle, relative to the width 32 of the board. Thus, placement of the turbulence-inducing elements 44 at an angle of about 45 degrees results in a panel 12 having less mass when compared with the panel 12 having turbulence-inducing elements placed at an angle of 90 degrees.

Referring again to FIG. 2, the panel 12 may define one or more channels 40. There may be a first channel 40A, a second channel 40B, and a third channel 40C. The turbulence-inducing elements 44 may be formed to open into the channel 40 such that each of the turbulence-inducing elements 44 and each of the channels 40 are in fluid communication with one another. This allows fluid and air to flow between the channel 40 and any of the first and/or second turbulence-inducing elements 44A, 44B when the panel 12 is attached to the mounting surface 14. More specifically, when water, moisture, and/or air is flowing between the panels 12 and the mounting surface 14, gravity can cause the fluid to flow in a generally downward direction. The turbulence-inducting elements 44A, 44B may receive and direct, i.e., funnel, fluid into a turbulent flow between the respective notched portion 42A, 42B and the mounting surface 14.

The inner surface 27 also includes an undulating portion 46 extending between the first end surface 18 and the second end surface 20, such that the contour portion 36 is disposed between the notched portion 42 and the undulating portion 46 to define the respective channel 40. The panel 12 may include more than one undulating portion 46. With continuing reference to FIG. 2, the undulating portion 46 may include a first undulating portion 46A and a second undulating portion 46B that extend along the longitudinal axis 22 in spaced and parallel relationship to one another. Each undulating portion 46 is contoured toward the outer surface 28 in an undulating fashion, away from the reference plane 38, such that the undulating portion 46 defines a plurality of curves 48.

Each curve 48 may be configured to open to the respective channel(s) 40 such that the curves 48 and the respective channel(s) 40 are in fluid communication with one another. Further, the undulating portions 46A, 46B are disposed horizontally, when the panel 12 is attached to the mounting surface 14. Thus, as water flows downward between the panel 12 and the mounting surface 14, water may enter the first channel 40A, from the first turbulence-inducing element 44A. Some of the water contacts the first undulating portion 46A, where portions of the water is redirected to flow in a different direction (e.g., a horizontal direction), until the water reaches an adjacent curve 48, where the water flows through the curve 48, into the second channel 40B. Some of the water, however, flows directly through one of the curves 48, into the second channel 40B, until the water contacts the undulating portion 46B of the second undulating portion 46B. Therefore, once the water contacts the second undulating portion 46B, the water is redirected by the second undulating portion 46B in a different direction (e.g., a horizontal direction), until the water reaches an adjacent curve 48. Once the water reaches the adjacent curve 48, the water flows through the adjacent curve 48, into the third channel 40C. Some of the water received from the second channel 40B, however, flows directly through the curves 48, into the third channel 40C. Inside the third channel 40C, water contact the second turbulence-inducing elements 44B, such that the second turbulence-inducing elements 44B, in combination with the top edge surface 24, cooperate to redirect the water to flow out of a lap joint 50 defined between the adjacent panels 12A, 12B (shown in FIG. 2). Thus, water can be directed away from a mounting surface at a height higher than the bottom of the mounting surface (e.g., the panel can function as a secondary gutter system in conjunction with panels devoid of voids 29).

It should be appreciated, however, that not all of the water flows out of the lap joint 50. Some of the water can also flow down behind the next lower panel 12, via the turbulence-inducing elements 44A and the first notched portion 42A.

Figure 7:
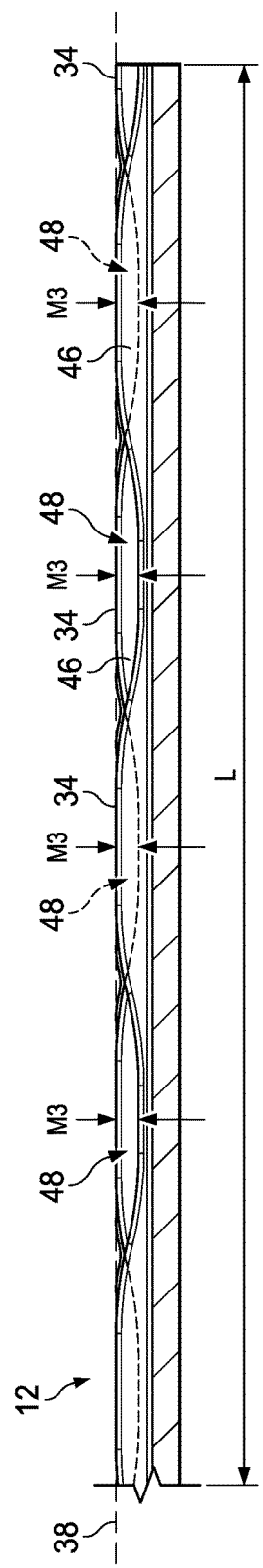
FIG. 7 is a schematic partial sectional view of the panel of FIG. 6, taken along section line 7-7.

Referring again to FIGS. 2 and 5, the contour portion 36 may include a first contour portion 36A, a second contour portion 36B, and a third contour portion 36C. The first contour portion 36A defines a first channel 40A, the second contour portion 36B defines a second channel 40B, and the third contour portion 36C defines a third channel 40C. More specifically, the first channel 40A is defined between the first notched portion 42A and the first undulating portion 46A, the second channel 40B is defined between the first undulating portion 46A and the second undulating portion 46B, and the third channel 40C is defined between the second undulating portion 46B and the second notched portion 42B. Each curve 48 of the first undulating portion 46A extends along the longitudinal axis 22 in offset relationship to each curve 48 of the second undulating portion 46B. Therefore, in the embodiment shown in FIGS. 2 and 7, the curves 48 may not be in alignment with one another in the direction transverse to the longitudinal axis 22, i.e., staggered relative to one another.

With continuing reference to FIGS. 2 and 3, each of the first turbulence-inducing elements open to the first channel 40A such that each of the first turbulence-inducing elements 44A and the first channel 40A are in fluid communication with one another. Additionally, each of the first turbulence-inducing elements 44A extend to the top edge surface 24 such that the first turbulence-inducing elements 44A are continuous between the top edge surface 24 and the first channel 40A. Each curve 48 is open to the respective first channel 40A, second channel 40B, and/or third channel 40C. Also, each of the second turbulence-inducing elements 44B open to the third channel 40C such that each one of the second turbulence-inducing elements 44B and the third channel 40C are in fluid communication with one another. Each of the second turbulence-inducing elements 44B also extend to the bottom edge surface 26 such that the second turbulence-inducing elements 44B are continuous between the third channel 40C and the bottom edge surface 26. As such, each one of the turbulence-inducing elements 44, channels 40, and curves 48 are in fluid communication with one another to promote air flow and fluid flow between the turbulence-inducing elements 44, the channels 40, and the curves 48, when the panels 12 are attached to the mounting surface 14. The With reference to FIG. 6, in one embodiment, the channel 40 may be aligned at an angle, relative to a width 32 of the board, of between 80 degrees and 100 degrees. In another embodiment, the channel 40 may be aligned at an angle, relative to the width 32 of the board, of 90 degrees.

With reference to FIG. 5, each channel 40 has a maximum first depth M1, relative to the reference plane 38. The maximum first depth M1 is defined as the distance between the reference plane 38 and a point on the contour surface that is at the greatest or most extreme distance.

Figure 8:
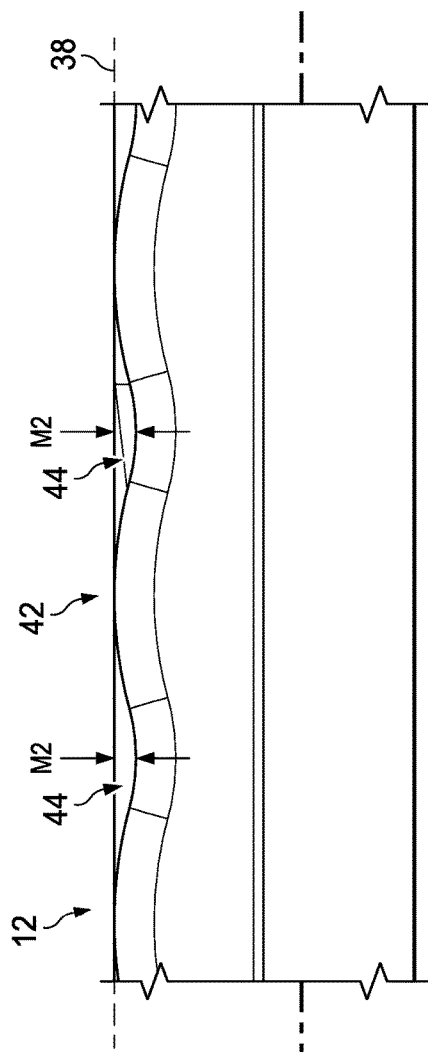
FIG. 8 is a schematic partial side view of the panel, illustrating turbulence-inducing elements defined in the panel.

With reference to FIG. 8, the turbulence-inducing element 44 has a maximum second depth M2, relative to the reference plane 38. The maximum second depth M2 is defined as the distance between the reference plane 38 and a point on the notched portion 42 that is at the greatest distance. The maximum second depth M2 may be less than the maximum first depth M1 of the channels 40.

The undulating portion 46 has a maximum third depth M3, relative to the reference plane 38. In one non-limiting example, the maximum third depth M3 of the curve 48 of the undulating portion 46 is always less than the maximum first depth M1 of the channels 40 of the contoured portion. Further, the maximum third depth M3 of the curves 48 of the undulating portions 46 may be greater than the maximum second depth M2 of the turbulence-inducing elements 44 of the notched portions 42.

Figure 6:
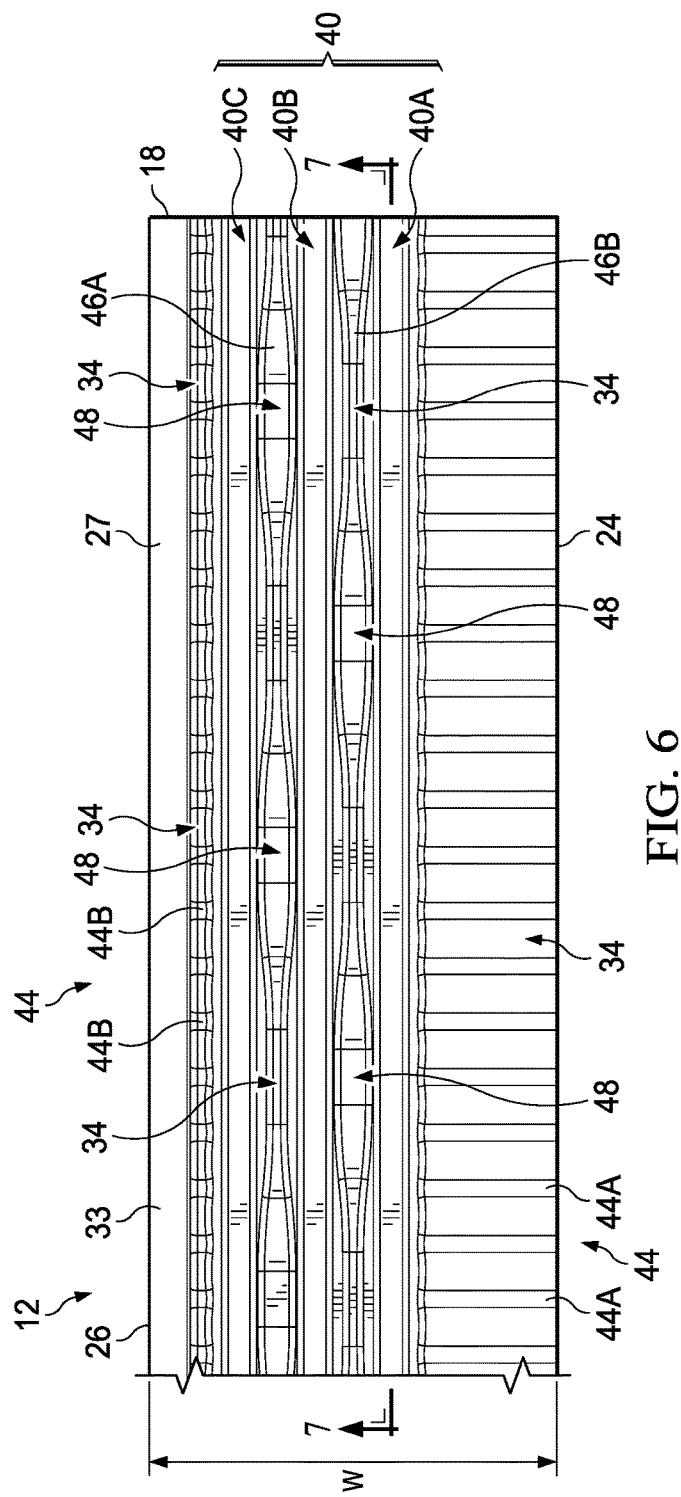
FIG. 6 is a schematic plan view of the inner surface of the panel.

Additionally, in the exemplary embodiment shown in FIG. 6, there may be at least seven of the first turbulence-inducing elements 44A and there may be at least seven of the second turbulence-inducing elements 44B for each of the first undulating portion 46A and the second undulating portion 46B, respectively.

Referring again to FIGS. 1-4, the panels 12 are overlapped with one another to form the lap joint 50 therebetween, as the panels 12 are attached to the mounting surface 14. Referring specifically to FIG. 2, the lap joint 50 is defined by the notched portion 42A of a first panel 12A overlapping a portion of the outer surface 28 of a second panel 12B, opposite the first notched portion 42A of the second panel 12B, as the top edge surface of the second panel 12B is disposed in facing relationship to the first panel 12A. Therefore, in this arrangement, the second turbulence-inducing elements 44B of the first panel 12A are open to the portion of the outer surface 28 of the second panel 12. The bottom edge surface 26 of the first panel 12A faces downward. Thus, when the panels 12 are attached to the mounting surface 14, the turbulence-inducing elements 44 and the curves 48 are oriented in a vertical direction, while the channels 40 are oriented in a horizontal direction. This orientation allows the fluid to flow downward, with large amount flows down into the second turbulence-inducing elements 44B, where the fluid exits the voids 29.

Panel materials and methods of preparing the panels are described herein. The panels can include any suitable material for use as a building material including, but not limited to, cellulosic materials (e.g., wood, pulp, wood chips), glass (e.g., glass fibers), polymers (e.g., organic polymers or inorganic polymers), cementitious materials (e.g., Portland cement, calcium aluminate cement, slag, or calcium sulfate), and combinations thereof.

Suitable organic polymers include, but are not limited to, polyurethanes, epoxies, polyesters, polystyrenes, polyethylenes, polypropylenes, polyvinyl chlorides, nylons, phenolics, acrylic polymers, styrene-butadiene copolymers, acrylonitrile-butadiene-styrene copolymers, combinations thereof, and composites thereof. For instance, polyurethane composites can be formed using highly reactive systems such as highly reactive polyols, isocyanates, or both. For example, the composites can be formed by the reaction of at least one isocyanate, selected from the group consisting of diisocyanates, polyisocyanates, and mixtures thereof, and at least one polyol, in the presence of an inorganic filler and optionally, a catalyst. Isocyanates suitable for use in the polyurethane composite described herein include one or more monomeric or oligomeric poly- or di-isocyanates. The monomeric or oligomeric poly- or diisocyanate include aromatic diisocyanates and polyisocyanates. The isocyanates can also be blocked isocyanates, or pre-polymer isocyanates (e.g., castor oil pre-polymer isocyanates and soy polyol pre-polymer isocyanates). An example of a useful diisocyanate is methylene diphenyl diisocyanate (MDI). Useful MDI's include MDI monomers, MDI oligomers, and mixtures thereof Further examples of useful isocyanates include those having NCO (i.e., the reactive group of an isocyanate) contents ranging from about 25% to about 35% by weight. Examples of useful isocyanates are found, for example, in Polyurethane Handbook: Chemistry, Raw Materials, Processing Application, Properties, 2nd Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M7OL (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein is between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

The at least one polyol for use in the polyurethane composite can include polyester polyols, polyether polyols, or combinations thereof. In some embodiments, the at least one polyol can include 50% or more of one or more highly reactive (i.e., first) polyols. For example, the at least one polyol can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g. 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl group. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a C1-C18 alkyl, or a C1-C12 alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophcnol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, or combinations thereof. Examples of suitable mono alkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt. % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more first polyols can include an aromatic polyester, an aromatic polyether polyol, or a combination thereof. In some embodiments, the one or more first polyols include an aromatic polyester polyol such as those sold under the TEROL® trademark (e.g., TEROL® 198).

Examples of highly reactive polyols also include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JcffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., and a primary hydroxyl number of 288-304 mg KOH/g.

The at least one polyol for use in the polyurethane composites can include one or more plant-based polyols or non plant-based polyols. In some embodiments, the plant-based polyols are highly reactive polyols. The one or more plant-based polyols useful in the polyurethane composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composites include, for example, castor oil, coconut oil, corn oil, cottonseed oil, lesquerella oil, linseed oil, olive oil, palm oil, palm kernel oil, peanut oil, sunflower oil, tall oil, and mixtures thereof.

In some embodiments, the one or more polyols include a less reactive polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; Stepanpol PS-2052A (commercially available from the Stepan Company); Agrol2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow.

The at least one polyol can include 50% or less of one or more less reactive polyols in addition to the one or more highly reactive polyols. For example, the at least one polyol can include less than 45%, less than 40%, less than 35%, less than 30%, less than 25%, less than 20%, less than 15%, less than 10%, or less than 5%, of one or more less reactive polyols. The at least one polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the at least one polyol can be from about 100 to 600, 150 to 550, 200 to 500, 250 to 440, 300 to 415, and 340 to 400.

The polyurethane composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the at least one polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkanolamine. The alkanolamine can be a dialkanolamine, a trialkanolamine, or a combination thereof. Suitable dialkanolamines include dialkanolamines which include two hydroxy-substituted C1-C12 alkyl groups (e.g., two hydroxy-substituted C1-C8 alkyl groups, or two hydroxy-substituted C1-C6 alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted C1-C12 alkyl groups (e.g., three hydroxy-substituted C1-C8 alkyl groups, or three hydroxy-substituted C1-C6 alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl) amine, hydroxypropyl di(hydroxyethyl)amine, tri (hydroxypropyl)amine, hydroxyethyl di(hydroxy-n-butyl) amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diaminc sold under the trade name CARPOL® EDAP-800 (Carpenter Co., Richmond, Va.).

The additional isocyanate-reactive monomer (when used) can be present in varying amounts relative the at least one polyol used to form the polyurethane. In some embodiments, the additional isocyanate-reactive monomer can be present in an amount of 30% or less, 25% or less, 20% or less, 15% or less, 10% or less, or 5% or less by weight based on the weight of the at least one polyol.

As indicated herein, in the polyurethane composites, an isocyanate is reacted with a polyol (and any additional isocyanate-reactive monomers) to produce the polyurethane formulation. The ratio of isocyanate groups to the total isocyanate reactive groups, such as hydroxyl groups, water and amine groups, can be in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

As described herein, the polyurethane composites include a polyurethane formed by the reaction of at least one isocyanate and at least one polyol in the presence of an inorganic filler. The inorganic filler can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar;

bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; and mixtures thereof. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the inorganic filler used is fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein.

The inorganic filler is present in the polyurethane composites described herein in amounts from 40% to 90% by weight. In some embodiments, the inorganic filler can be present in amounts from 60% to 85% by weight. Examples of the amount of inorganic filler present in the composites described herein include 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90%.

In addition to an inorganic filler, the composite can include an organic filler, such as a recycled polymeric material. Suitable examples include pulverized polymeric foam or recycled rubber material.

In some embodiments, inorganic fibers or organic fibers can be included in the polyurethane composite, e.g., to provide increased strength, stiffness or toughness. Fibers suitable for use with the polyurethane composite described herein can be provided in the form of individual fibers, fabrics, rovings, or tows. These can be added prior to polymerization and can be chopped before or during the mixing process to provide desired fiber lengths. Alternately, the fibers can be added after polymerization, for example, after the composite mixture exits the mixing apparatus. The fibers can be from 3 to 50 mm in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of fillers in the polyurethane composite as described herein can modify and/or improve the chemical and mechanical properties of the composite. For example, the optimization of various properties of the composite allows their use in building materials and other structural applications.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used.

The reaction between the at least one polyol and the at least one isocyanate is extremely exothermic. For each mole of the isocyanate functional group, up to 25 kcal of energy is emitted from the reaction. It is difficult for the heat to diffuse in a molded environment. The excessive heat can cause scorching, blemishes, and/or other issues associated with the highly reactive polyurethane systems on the surface of molded products.

Additional components useful with the polyurethane composite include foaming agents, blowing agents, surfactants, chain-extenders, crosslinkers, coupling agents, UV stabilizers, fire retardants, antimicrobials, anti-oxidants, evaporative coolants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture in an amount of from greater than 0% to 5% by weight or less, based on the weight of the mixture. In some embodiments, water may be present in the mixture in an amount of from 0.02%, 0.03%, 0.04%, 0.05%, 0.10%, 0.15%, 0.2%, 0.25%, 0.3%, 0.4%, 0.5%, 0.6%, 0.7%, 0.8%, 0.9%, 1%, 1.2%, 1.5%, or 1.6%, 1.7%, 1.8%, 1.9%, or 2%, by weight, based on the weight of the mixture. For example, the water can be present in a range of 0.02% to 4%, 0.05% to 3%, 0.1% to 2%, or 0.2% to 1% by weight, based on the weight of the mixture. In some embodiments, the water is present from 0.04% to 2% or from 0.02% to 0.5% by weight, based on the weight of the mixture.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the composite described herein. These reactants help the polyurethane system to distribute and contain the inorganic filler and/or fibers within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloro aniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the at least one polyol in the composite material. For example, the polyurethane can be formed by the reaction of an isocyanate, a polyol, and a crosslinker Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of an inorganic filler such as fly ash and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

The polymer composite can be produced by mixing the at least one isocyanate, the at least one polyol, the inorganic filler, and optionally a catalyst, in a mixing apparatus such as a high speed mixer or an extruder. In some embodiments, mixing can be conducted in an extruder.

The reactants and other materials can be added in any suitable order. For example, in some embodiments, the mixing stage of the method used to prepare the polyurethane composite includes: (1) mixing the polyol and inorganic filler; (2) mixing the isocyanate with the polyol and the inorganic filler; and optionally (3) mixing the catalyst with the isocyanate, the polyol, and the inorganic filler. In some embodiments, the mixing step of the method used to prepare the polyurethane composite includes mixing the liquid ingredients (i.e., the polyol, isocyanate, catalyst, surfactants, and water) and then combining the mixed liquid ingredients with the inorganic filler and optional fiber.

The polyurethane composite mixture can be blended in any suitable manner to obtain a homogeneous or heterogeneous blend of the at least one isocyanate, at least one polyol, inorganic filler, and optional catalyst. An ultrasonic device can be used for enhanced mixing and/or wetting of the various components of the polyurethane composite. Such enhanced mixing and/or wetting can allow a high concentration of filler to be mixed with the polyurethane matrix. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The mixture can then be deposited or otherwise transferred into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. At least one of the two opposed belts include a contact portion-forming section, and a contour portion-forming section. A molded panel 12 can then be formed followed by removal of the article from the mold.

The at least one isocyanate and the at least one polyol can begin to react in the mixer and/or extruder or once they leave the mixer and/or extruder (i.e., in the mold).

The molded panels 12 described herein when formed can include at least one surface that is in physical contact with an interior mold surface and a core (at the center of the molded panel 12). In some embodiments, the molded panels 12 do not comprise a skin. Polyurethane composites comprising a skin are materials with a low density foamed core surrounded by a nearly solid skin (high density) of the same material and are typically formed by polymerization of a monomer mixture in the presence of a blowing agent. In some embodiments, the increase in mold temperature resulting from the polyurethane reaction causes the molds to become flexible and, as a result, the volume of the composite in the mold is not sufficiently constrained to cause the creation of a skin (as opposed to rigid molds that constrain the molded panel 12 as it is being formed). In some embodiments, the polyurethane composite disclosed herein has a density at the surface that is no greater than twice the density of the core (as opposed to polyurethane composites with skins wherein the polyurethane composite has a density at the surface that is greater than twice the density of the core). In some embodiments, the polyurethane composite disclosed herein has a density at the surface that is no greater than 1.75 times 1.5 times, or 1.25 times the density of the core.

Highly filled polyurethane composites can have an inconsistent structure that includes domains of irregular cells, voids, and/or clusters of filler bonded together with polyurethane. In some embodiments, these highly filled composites have a cell count of less than 100 per linear inch (pli), for example, less than 90 pli, less than 80 pli, less than 70 pli, less than 60 pli, less than 50 pli, less than 40 pli, less than 30 pli, less than 20 pli, less than 10 pli, less than 5 pli, or even 0 pli (i.e., a non-cellular structure with no defined cells).

In some embodiments, the composite mixture described herein can be foamed. The polyol and the isocyanate can be allowed to produce a foamed composite material after mixing the components according to the methods described herein. The composite materials can be formed while they are actively foaming or after they have foamed. For example, the material can be placed under the pressure of a mold cavity prior to or during the foaming of the composite material. The polyurethane composites can be formed into the panels 12 having the desired voids 29, described above.

The voids 29, e.g., the channels 40, turbulence-inducing elements 44, and curves 48, are formed as an integral part of the molded panel 12. As such, further machining of the panel 12, to form the voids 29, is not required. Additionally, any skin or other surface layer formed on the molded panel 12, as result of the molding process, will automatically cover the entire exterior of the molded panel 12, including within the voids 29. Also, the voids 29 may be formed through the molding process with complex geometries that may not be achievable or repeatable through other machining processes.

The polyurethane composites can be flexible, semi-rigid or rigid foams. In some embodiments, the flexible foam is reversibly deformable (i.e., resilient) and can include open cells. A 8"×1"×1" piece of a flexible foam can generally wrap around a 1" diameter mandrel at room temperature without rupture or fracture. Flexible foams also generally have a density of less than 5 lb/ft3 (e.g. 1 to 5 lb/ft3). In some embodiments, the rigid foam is irreversibly deformable and can be highly crosslinked and/or can include closed cells. Rigid foams generally have a density of 5 lb/ft3 or greater. In some embodiments, the overall density of the molded panel 12 can be 5 lb/ft3 or greater. For example, the overall density of the molded panel 12 can be 5 lb/ft3 to 80 lb/ft3, 10 lb/ft3 to 70 lb/ft3, 15 lb/ft3 to 65 lb/ft3, 20 lb/ft3 to 60 lb/ft3, 25 lb/ft3 to 55 lb/ft3, or 30 lb/ft3 to 50 lb/ft3.

The following examples illustrate, but do not in any way limit, the scope of the disclosure, as described and claimed.

EXAMPLES

Testing evaluates the ventilation capacity and drainage capacity of the various drainage panel designs using selected criteria from ASTM E2273 and ASTM E2925.

Testing conditions and results for each of four wall designs are provided. The testing of each wall design includes mounting panels to a PS2 rated mounting surface, such that the panels overlap one another to form lap joints therebetween. Such testing conditions and results are set forth in detail below in the following Tables.

The four designs include: Drainable house wrap, Furring, Panel A (as illustrated in FIG. 3), and Control. With the Drainable house wrap, a drainable housewrap, including spacers, is secured to the mounting surface. Next, ten inch polyurethane composite siding is installed against the drainable house wrap. Exemplary results of this testing are shown in Table 1.

The furring design includes securing spunbond polyethylene house wrap to the mounting surface. Four feet long corrugated plastic furring strips (¼ in thick) are installed 16 inches apart at stud locations. Polyurethane composite siding is installed over top of the furring strips. Exemplary results of this testing are shown in Table 2.

With Panel A, spunbond polyethylene house wrap is secured to the mounting surface. Next, Panel A was installed over top of the house wrap. With the Control, spunbond polyethylene house wrap was installed onto the mounting surface with tape. Next, ten inch polyurethane composite was installed over the house wrap. Exemplary results of this testing are shown in Table 3.

Exemplary results of this testing are shown in Table 4.

Exemplary results of testing the four designs using Appendix A1 Drainage and Ventilation/Airflow Test of ASTM E2925 are shown in Tables 1-4 below, which assess ventilation capacity. Further, Exemplary results of testing the four design using Appendix A2 Drainage Test of ASTM E2273 are shown in Table 5 below, which assess drainage capacity.

With respect to testing of the four designs with respect to ventilation, the data in Tables 1-4 illustrate that the lap joints contribute significantly to the overall ventilation capacity. During testing, Tables 1-4 illustrate the flow rate when a drainage plane at the top of the wall is sealed (column 1) versus the flow rate when the drainage plane at the top of the wall is not sealed (column 2). Column 3 illustrates the difference in the flow with and without the top of the wall being sealed.

TABLE 1

| Pressure at bottom edge of drainage plane Pascals | Wall Design - Drainable House Wrap Flow Rate - CFM | | |
|---|---|---|---|
| | Sealed Drainage Plane at Top | Not Sealed Drainage Plane at Top | Difference - Not Sealed less Sealed at top |
| 1 | 0.00 | 0.0 | 0.00 |
| 5 | 0.08 | 0.1 | 0.02 |
| 1 | 0.09 | 0.0 | 0.00 |
| 2 | 0.15 | 0.1 | −0.01 |
| 5 | 0.21 | 0.2 | −0.01 |
| 1 | 0.34 | 0.3 | −0.01 |
| 5 | 1.26 | 1.2 | −0.05 |
| 1 | 1.86 | 1.8 | 0.01 |

TABLE 2

| Pressure at bottom edge of drainage plane Pascals | Wall Design - Furring Flow Rate - CFM | | |
|---|---|---|---|
| | Sealed Drainage Plane at Top | Not Sealed Drainage Plane at Top | Difference - Not Sealed less Sealed at top |
| 1 | 0.51 | 0.92 | 0.41 |
| 5 | 1.80 | 2.32 | 0.53 |
| 10 | 3.36 | 3.91 | 0.55 |
| 25 | 5.96 | 6.60 | 0.64 |
| 50 | 7.22 | 8.45 | 1.23 |
| 100 | 10.3 | 11.6 | 1.25 |
| 250 | 16.4 | 16.6 | 0.17 |

TABLE 3

| Pressure at bottom edge of drainage plane Pascals | Wall Design - Panel A Flow Rate - CFM | | |
|---|---|---|---|
| | Sealed Drainage Plane at Top | Not Sealed Drainage Plane at Top | Difference - Not Sealed less Sealed at top |
| 1 | 0.28 | 0.28 | 0.00 |
| 5 | 0.92 | 0.96 | 0.04 |
| 10 | 1.57 | 1.67 | 0.10 |
| 25 | 2.59 | 2.80 | 0.21 |
| 50 | 4.02 | 4.21 | 0.20 |
| 100 | 5.96 | 6.29 | 0.33 |
| 250 | 8.45 | 9.08 | 0.63 |
| 500 | 11.6 | 12.2 | 0.58 |
| 1000 | 15.6 | 15.4 | −0.27 |

TABLE 4

| Pressure at bottom edge of drainage plane Pascals | Wall Design - Control Flow Rate - CFM | | |
|---|---|---|---|
| | Sealed Drainage Plane at Top | Not Sealed Drainage Plane at Top | Difference - Not Sealed less Sealed at top |
| 1 | 0.18 | 0.18 | 0.00 |
| 5 | 0.33 | 0.33 | 0.00 |
| 10 | 0.46 | 0.46 | 0.00 |
| 25 | 2.51 | 2.59 | 0.08 |
| 50 | 4.02 | 4.12 | 0.10 |
| 100 | 5.82 | 6.02 | 0.20 |
| 250 | 4.48 | 4.77 | 0.30 |
| 500 | 6.20 | 6.42 | 0.22 |
| 1000 | 8.61 | 8.61 | 0.00 |

With respect to testing the four wall designs with respect to drainage, the data in table 5 is illustrates that water drains from all of the walls in significant quantities by exiting via the horizontal lap joints between the panels. Water egress is evident from the lap joints, regardless of the drainage plane ventilation capacity. Water also drained behind the panels when furring strips and drainable house wraps with spacers were used.

TABLE 5

| Wall Type | pounds of water collected | percent of water collected |
|---|---|---|
| Drainable House Wrap | 8.760 | 96.7% |
| Furring | 7.760 | 85.6% |
| Panel A | 8.215 | 90.6% |
| Control | 7.695 | 84.9% |

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A panel configured for attachment to a mounting surface of a building structure, the panel comprising:
   a first end surface and a second end surface spaced from each other along a longitudinal axis;
   a top edge surface and a bottom edge surface spaced from each other and offset from the longitudinal axis; and
   an inner surface and an outer surface opposed to each other and extending from the first end surface and the second end surface, wherein the inner surface comprises,
      a contact portion disposed on a reference plane,
      a contour portion contoured toward the outer surface, away from the reference plane, such that the contour portion defines a channel extending along at least a portion of a length of the panel between the first end surface and the second end surface,
      a notched portion contoured toward the outer surface, away from the reference plane, such that the notched portion defines a turbulence-inducing element, and
      an undulating portion extending between the first end surface and the second end surface, such that the contour portion is disposed between the notched portion and the undulating portion, wherein the undulating portion is contoured toward the outer surface in an undulating fashion, away from the reference plane, wherein the undulating portion comprises a first undulating portion and a second undulating portion each defining a plurality of curves, and wherein each of the plurality of curves of the first undulating portion extends in offset relationship to each of the plurality of curves of the second undulating portion.

2. The panel of claim 1, wherein the channel extends parallel to the longitudinal axis.

3. The panel of claim 1, wherein the notched portion defines a turbulence-inducing element extending at an angle to the longitudinal axis.

4. The panel of claim 1, wherein the notched portion defines a plurality of turbulence-inducing elements.

5. The panel of claim 4, wherein the plurality of turbulence-inducing elements extend in spaced and parallel relationship to one another.

6. The panel of claim 1, wherein the notched portion comprises a first notched portion and a second notched portion;
   wherein the first notched portion defines a first plurality of turbulence-inducing elements and the second notched portion defines a second plurality of turbulence-inducing elements; and
   wherein the first plurality of turbulence-inducing elements extend between the channel and the top edge surface and the second plurality of turbulence-inducing elements extend between the channel and the bottom edge surface.

7. The panel of claim 6, wherein each one of the first plurality of turbulence-inducing elements extends at a first angle to the channel and each one of the second plurality of turbulence-inducing element extends at a second angle to the channel.

8. The panel of claim 1, wherein the notched portion comprises a first notched portion and a second notched portion;
   wherein the first notched portion defines a first plurality of turbulence-inducing elements and the second notched portion defines a second plurality of turbulence-inducing elements;
   wherein the contour portion comprises a first contour portion, a second contour portion, and a third contour portion;
   wherein the first contour portion defines a first channel, the second contour portion defines a second channel, and the third contour portion defines a third channel;
   wherein the first channel is defined between the first notched portion and the first undulating portion;
   wherein the second channel is defined between the first undulating portion and the second undulating portion; and
   wherein the third channel is defined between the second undulating portion and the second notched portion.

9. The panel of claim 1, wherein the contact portion is adjacent to the top edge surface, the bottom edge surface, or both.

10. A panel system configured for attachment to a mounting surface of a building structure, the panel system comprising:
   a plurality of panels configured to be attached in overlapping relationship to one another on the mounting surface of the building structure;

wherein each of the plurality of panels is in accordance with claim 1.

11. A building structure comprising:
a mounting surface; and
a plurality of panels attached in overlapping relationship to one another on the mounting surface of the building structure;
wherein each of the plurality of panels is in accordance with claim 1.

12. The building structure of claim 11, wherein each one of the plurality of panels is attached in overlapping relationship to one another on the mounting surface of the building structure such that the longitudinal axis of each one of the plurality of panels extends horizontally along the mounting surface.

13. The building structure of claim 11, wherein the mounting surface is devoid of furring strips.

14. The building structure of claim 11, wherein the mounting surface comprises a nonwoven material devoid of protrusions.

15. The building structure of claim 11, wherein the building structure further comprises at least one of a window trim and a door trim, and wherein at least a portion of the outer surfaces of the plurality of panels is in a plane of at least one of an outer surface of the window trim and or an outer surface of a door trim.

16. The building structure of claim 11, further comprising a panel devoid of a channel or a notched portion positioned below the plurality of panels.

17. A panel configured for attachment to a mounting surface of a building structure, the panel comprising:
a first end surface and a second end surface spaced from each other along a longitudinal axis;
a top edge surface and a bottom edge surface spaced from each other and offset from the longitudinal axis; and
an inner surface and an outer surface opposed to each other and extending from the first end surface and the second end surface,
wherein the inner surface comprises,
a contact portion disposed on a reference plane,
a first contour portion and a second contour portion, each contoured toward the outer surface, away from the reference plane, such that the first contour portion defines a first channel and the second contour portion defines a second channel, wherein the first and second channels each extend along a length of the panel between the first end surface and the second end surface;
a first notched portion and a second notched portion, each contoured toward the outer surface, away from the reference plane, such that the first notched portion defines a first plurality of turbulence-inducing elements and the second notched portion defines a second plurality of turbulence-inducing elements, wherein each of the first plurality of turbulence-inducing elements extend along the panel between the top edge surface and the first channel and each of the second plurality of turbulence-inducing elements extend along the panel between the bottom edge surface and the second channel; and
an undulating portion extending between the first end surface and the second end surface, such that the undulling portion is disposed between the first contour portion and the second contour portion, the first contour portion is disposed between the first notched portion and the undulating portion, and the second contour portion is disposed between the second notched portion and the undulating portion;
wherein the undulating portion is contoured toward the outer surface in an undulating fashion, away from the reference plane, wherein the undulating portion comprises a first undulating portion defining a first plurality of curves and a second undulating portion defining a second plurality of curves, and wherein each of the first plurality of curves extends in offset relationship to each of the second plurality of curves.

18. A method of making a panel configured for attachment to a mounting surface of a building structure, the method comprising:
molding a polymer in a mold cavity of a continuous mold formed at least in part by opposing surfaces of two opposed belts;
wherein the panel comprises a first end surface and a second end surface spaced from each other along a longitudinal axis and comprises:
a top edge surface and a bottom edge surface spaced from each other and offset from the longitudinal axis; and
an inner surface and an outer surface opposed to each other and extending from the first end surface and the second end surface;
wherein the inner surface comprises:
a contact portion disposed on a reference plane; and
a contour portion contoured toward the outer surface, away from the reference plane, such that the contour portion defines a channel extending lengthwise along at least a portion of the panel between the first end surface and the second end surface;
a notched portion contoured toward the outer surface, away from the reference plane, such that the notched portion defines a turbulence-inducing element, and
an undulating portion extending between the first end surface and the second end surface, such that the contour portion is disposed between the notched portion and the undulating portion, wherein the undulating portion is contoured toward the outer surface in an undulating fashion, away from the reference plane, wherein the undulating portion comprises a first undulating portion and a second undulating portion each defining a plurality of curves, and wherein each of the plurality of curves of the first undulating portion extends in offset relationship to each of the plurality of curves of the second undulating portion; and
wherein at least one of the two opposed belts comprises:
a contact portion-forming section; and
a contour portion-forming section.

* * * * *